C. M. Alexander,
Bridle,
N° 79,932. Patented July 14, 1868.
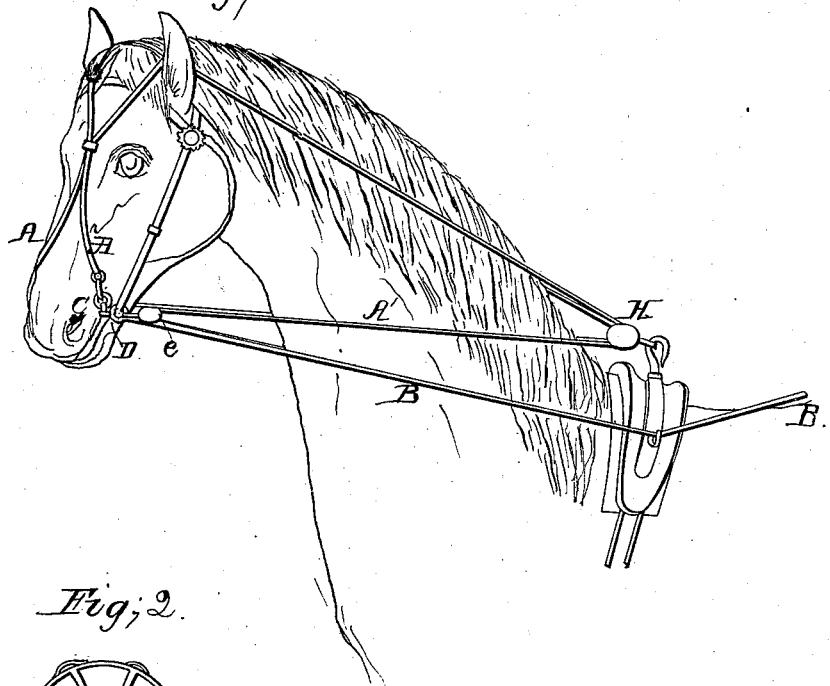
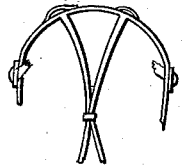
Witnesses:
Harry King
J. M. Stoops
Inventor:
C. M. Alexander

United States Patent Office.

C. M. ALEXANDER, OF WASHINGTON, DISTRICT OF COLUMBIA.

Letters Patent No. 79,932, dated July 14, 1868.

IMPROVED CHECK AND DRIVING-LINE.

The Schedule referred to in these Letters Patent and making part of the same.

TO ALL WHOM IT MAY CONCERN:

Be it known that I, C. M. ALEXANDER, of Washington, in the District of Columbia, have invented certain new and useful Improvements in Combined Check and Driving-Line; and do hereby declare that the following is a full, clear, and exact description thereof, reference being had to the accompanying drawings, and to the letters of reference marked thereon.

The nature of my invention consists in the use of a continuous double check, the peculiar arrangement of which will be hereinafter described.

In the annexed drawings, making part of this specification, A A' and B represent two continuous check-lines and hand-line combined.

The check-line A is attached to a bit, C, which works against the upper jaw or roof of the horse's mouth, passes up the face, and through loops in the headstall of the bridle, between the horse's ears, then back to the saddle, and either through rings or pulleys attached to said saddle, then merges into or becomes a part of the check-line A'. The line A' passes back to the horse's mouth in a direct line, and then through either the ring of a bit which bears upon the lower jaws, or through a pulley attached to said ring. This line then merges into or becomes a part of the driving or hand-line B. By this arrangement it will be seen that I draw upon both jaws of the horse at the same time and with the same lines, but in different directions. It is very evident that when I draw upon the hand-line B, I at the same time draw the head of the horse upward by means of the line A, and downward by means of the line A'. I deem it best to use two bits, although one may be used.

The advantages of this arrangement are that it gives more style to the horse's head, and effectually prevents his running away or kicking.

Having thus fully described my invention, what I claim as new, and desire to secure by Letters Patent, is—

The check-lines A and A', made continuous, and connected to or forming a part of the driving-line B, and operating upon the mouth of the animal with one or two bits, substantially as specified.

In testimony that I claim the foregoing, I have hereunto set my hand, this 30th day of June, 1868.

C. M. ALEXANDER.

Witnesses:
J. M. MASON,
WM. H. MASON.